UNITED STATES PATENT OFFICE.

JOHN W. HYATT AND FRANK V. POOL, OF NEWARK, NEW JERSEY.

MANUFACTURE OF PYROXYLINE.

SPECIFICATION forming part of Letters Patent No. 274,335, dated March 20, 1883.

Application filed March 29, 1882. (No specimens.)

*To all whom it may concern:*

Be it known that we, JOHN W. HYATT and FRANK V. POOL, of Newark, in the county of Essex and State of New Jersey, have invented a new and useful Improvement in Processes in the Manufacture of Pyroxyline, of which the following is a specification.

The invention has relation to a process in the treatment of soluble fiber, whereby the spent acids used therein are cleansed and restored to their original condition, and thereby a waste product saved. The acids usually employed are sulphuric and nitric, which contain more or less water and foreign matter. Experience has demonstrated that after the material has been subjected to the action of the acids and removed a considerable quantity of flock remains in suspension in the acid, and the strength of the acids will have been reduced to such an extent that they cannot be used again with satisfactory results unless the matter in suspension be removed and the acid restored to its original condition.

The object of our invention is economy in the manufacture of pyroxyline; and it consists in first treating the fiber with acid, removing the same, afterward freeing the acid of matter in suspension, and then restoring the deteriorated acids to substantially the condition in which they were originally.

In practicing our invention we make use, for precipitating the matter in suspension in the acid, of the process heretofore patented by one of us, in which barium sulphate or other inert material is employed in powdered form. By this means the acids are freed from the matter in suspension; but the same result may be accomplished by other suitable means. In practice the succeeding step consists in analyzing a sample of the acids, which will be done in any convenient way, whereby it is ascertained to what extent the ingredients have been reduced and how their efficiency has been impaired. It will be found, in nearly all instances, that the percentage of sulphuric acid and water will be increased, while the percentage of nitric acid will be diminished.

Having arrived at an accurate understanding of the ingredients, the process is completed by adding fresh acids of such strength and character as will restore the compound according to the original formula, or by such other treatment as will diminish the relative proportion of water, and thereby restore the compound, or change it to a new compound having different proportions, according to the circumstances of the case. In the manufacture of nitro-cellulose the percentage of nitric acid contained in the acid mixture is always decreased quite materially. The loss is supplied by adding a nitric acid of sufficient strength, or a mixture of strong sulphuric acid and nitric acid, as may be preferred, the strength and proportions being determined by analysis in the usual way.

We do not claim herein the method of purifying the spent acids which consists in use of an inert material in powdered form. Neither do we limit ourselves to that method of purifying the spent acids; but What we do claim as new, and desire to secure by Letters Patent, is—

In the manufacture of pyroxyline, the process herein described, consisting in treating the fiber with acid; second, after the removal of the fiber freeing the residual acid of matter in suspension, and, third, restoring the strength of the spent acid, all as specified.

In testimony that we claim the foregoing improvement in the manufacture of pyroxyline as above described we have hereunto set our hands this 21st day of September, 1881.

JOHN W. HYATT.
FRANK V. POOL.

Witnesses:
CHAS. C. GILL,
HERMAN GUSTOW.